United States Patent [19]
Branstetter

[11] Patent Number: 6,113,675
[45] Date of Patent: Sep. 5, 2000

[54] GAS SEPARATOR HAVING A LOW ROTATING MASS

[75] Inventor: Todd M. Branstetter, Nowata, Okla.

[73] Assignee: Camco International, Inc., Houston, Tex.

[21] Appl. No.: 09/174,187

[22] Filed: Oct. 16, 1998

[51] Int. Cl.[7] .................................................. E21B 43/38
[52] U.S. Cl. ........................... 95/261; 95/269; 95/270; 96/177; 96/196
[58] Field of Search .......................... 95/261, 269, 270; 96/177, 195, 196, 216

[56] References Cited

U.S. PATENT DOCUMENTS

| | | | |
|---|---|---|---|
| 3,258,895 | 7/1966 | Wiebe et al. ........................... | 95/269 |
| 3,887,342 | 6/1975 | Bunnelle . | |
| 4,088,459 | 5/1978 | Tuzson . | |
| 4,231,767 | 11/1980 | Acker . | |
| 4,330,306 | 5/1982 | Salant . | |
| 4,344,774 | 8/1982 | Skipper ........................... | 95/261 |
| 4,481,020 | 11/1984 | Lee et al. . | |
| 4,531,584 | 7/1985 | Ward . | |
| 4,971,603 | 11/1990 | Prinsloo et al. ........................... | 95/269 |
| 5,044,440 | 9/1991 | Stinessen et al. . | |
| 5,095,975 | 3/1992 | Bernhardt . | |
| 5,462,585 | 10/1995 | Niskanen et al. ........................... | 95/270 |
| 5,482,117 | 1/1996 | Kolpak et al. . | |
| 5,516,360 | 5/1996 | Normandeau et al. . | |
| 5,775,442 | 7/1998 | Speed ........................... | 95/269 |
| 5,902,378 | 5/1999 | Obrejanu ........................... | 95/261 |

Primary Examiner—David A. Simmons
Assistant Examiner—Minh-Chau T. Pham
Attorney, Agent, or Firm—Fletcher, Yoder & Van Someren

[57] ABSTRACT

A gas separator having a reduced rotating mass. The gas separator includes a stationary flow inducer that creates a vortex within an outer housing. The flow inducer includes an accelerator mechanism that increases the velocity of the fluid mixture as it flows through a portion of the gas separator. The resultant liquid and gaseous phases are directed from the gas separator through separate outlets.

21 Claims, 4 Drawing Sheets

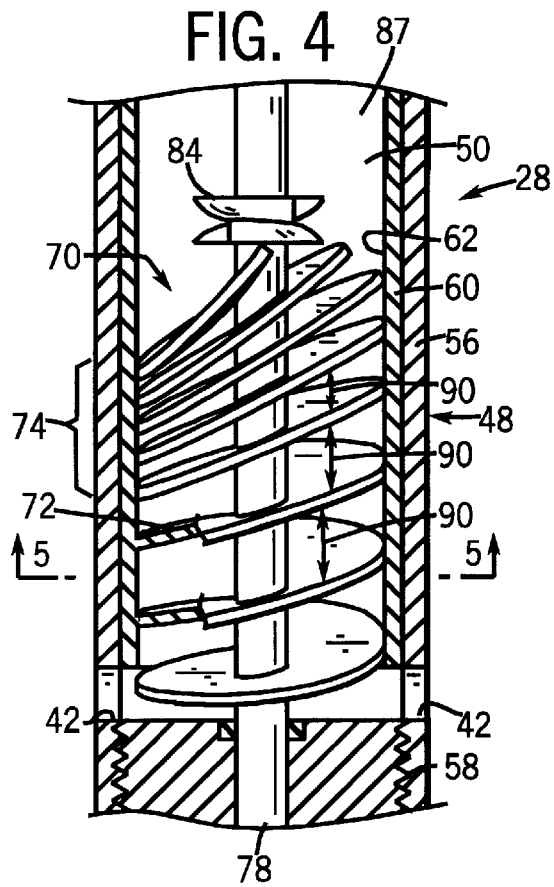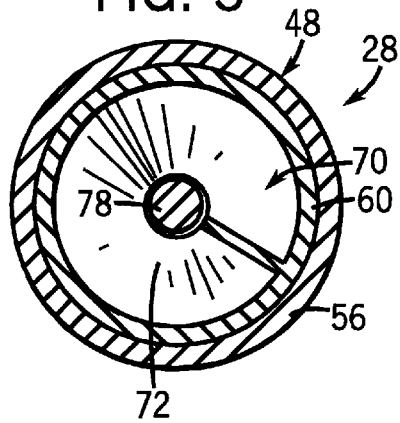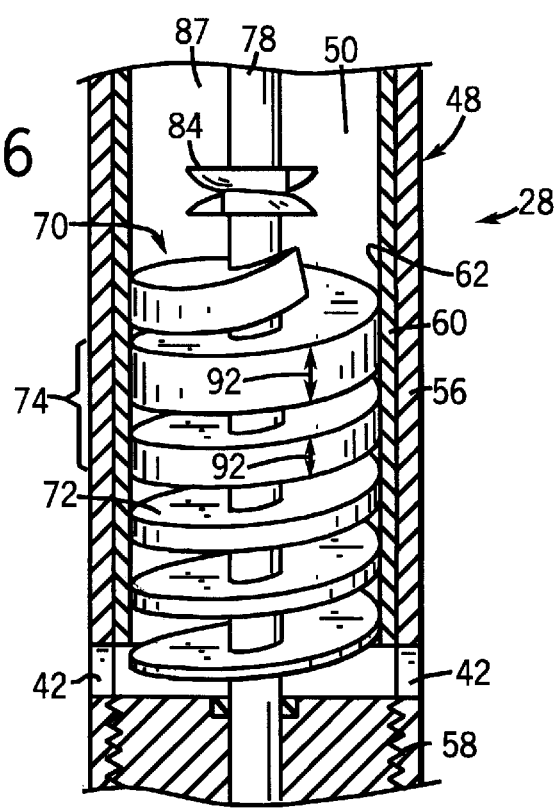

ued States Patent 6,113,675

GAS SEPARATOR HAVING A LOW ROTATING MASS

FIELD OF THE INVENTION

The present invention relates generally to a gas separator, such as those used in submergible pumping systems to separate gas from liquid, and particularly to a gas separator having a low rotating internal mass.

BACKGROUND OF THE INVENTION

Gas separators commonly are used to facilitate pumping of fluids that may have a high gas to liquid ratio. The fluid is passed through a gas separator to separate the fluid into its liquid and gas components. The liquid component can then be directed into a pump designed for pumping liquid.

For example, in production of petroleum and other useful fluids from production wells, submergible pumping systems often are used to raise the fluids collected in a well. A typical submergible pumping system includes a submergible motor designed to drive a centrifugal pump that pumps the production fluid to the earth's surface. If the production fluid has a relatively high gas content, a gas separator is utilized as the pump intake. This allows gas to be separated from the fluid prior to entering the centrifugal pump.

Gas separators, such as those used in a downhole environment, often utilize a screw-type inducer mounted to a rotatable shaft. The screw-type inducer rotates within an outer housing, and uses centrifugal force to separate free gas. Specifically, the fluid mixture enters the outer housing through intake ports and moves to a lower section of the screw-type inducer. At this point, the pressure of the fluid is increased and moved through the transition section of the inducer into the centrifuge where the separation occurs. The fluid is forced to the outside of the separator and then through outlets to the centrifugal pump. Because the gas is lighter, it remains towards the center of the separator as the heavier liquid is forced to the outside. The lighter gas rises through the separator and is vented to the annulus between the submergible pumping components and the wellbore casing.

Because the entire screw-type inducer is rotated through fluid to increase the pressure on the fluid, substantial power is required. It would be advantageous to substantially reduce the mass of rotating components in the gas separator.

SUMMARY OF THE INVENTION

The present invention features a gas separator for use in a submergible pumping system deployed in a wellbore to pump a production fluid. The gas separator comprises a housing having an interior surface that is generally tubular in shape. The housing includes a liquid inlet and a liquid outlet. A gas outlet is also disposed in the housing and includes a gas port exposed to the hollow interior at a position radially inward from the fluid port. A flow director system is mounted in a stationary position within a hollow interior defined by the housing. The flow director system is oriented to direct fluid flow in a generally spiral pattern along the interior surface of the housing between the liquid inlet and the liquid outlet. The flow director system also may include an accelerator mechanism to accelerate the flow of fluid as it travels along the interior surface of the housing.

According to another aspect of the invention, a gas separator is provided for use in a submergible pumping system, such as those deployed in a wellbore for pumping production fluids. The gas separator includes an enclosed, stationary screw, through which a production fluid mixture is forced. The enclosed, stationary screw imparts a centrifugal force to the production fluid mixture. Additionally, an accelerator mechanism cooperates with the stationary screw to increase the velocity at which the fluid mixture travels through the enclosed, stationary screw.

According to another aspect of the invention, a method is provided for separating gas from a fluid mixture. The method comprises directing a fluid mixture through a cylindrical cavity formed by an interior wall surface. The fluid mixture is circulated along a stationary guide disposed along the interior wall to impart a centrifugal force thereto. Further, the speed of the fluid mixture may be increased as it travels along the stationary guide. A gas component and a liquid component are separated from the fluid mixture, and those components are separately removed from the cylindrical cavity. A gas compressor may be used to pressurize the gas component, and thereby facilitate removal from the cavity.

BRIEF DESCRIPTION OF THE DRAWINGS

The invention will hereafter be described with reference to the accompanying drawings, wherein like reference numerals denote like elements, and:

FIG. 4 illustrates an alternate embodiment of the flow director system illustrated in FIG. 2;

FIG. 5 is a cross-sectional view taken generally along line 5—5 of FIG. 4;

FIG. 6 is another alternate embodiment of the flow director system illustrated in FIG. 2;

DETAILED DESCRIPTION OF THE PREFERRED EMBODIMENTS

Figure 1:
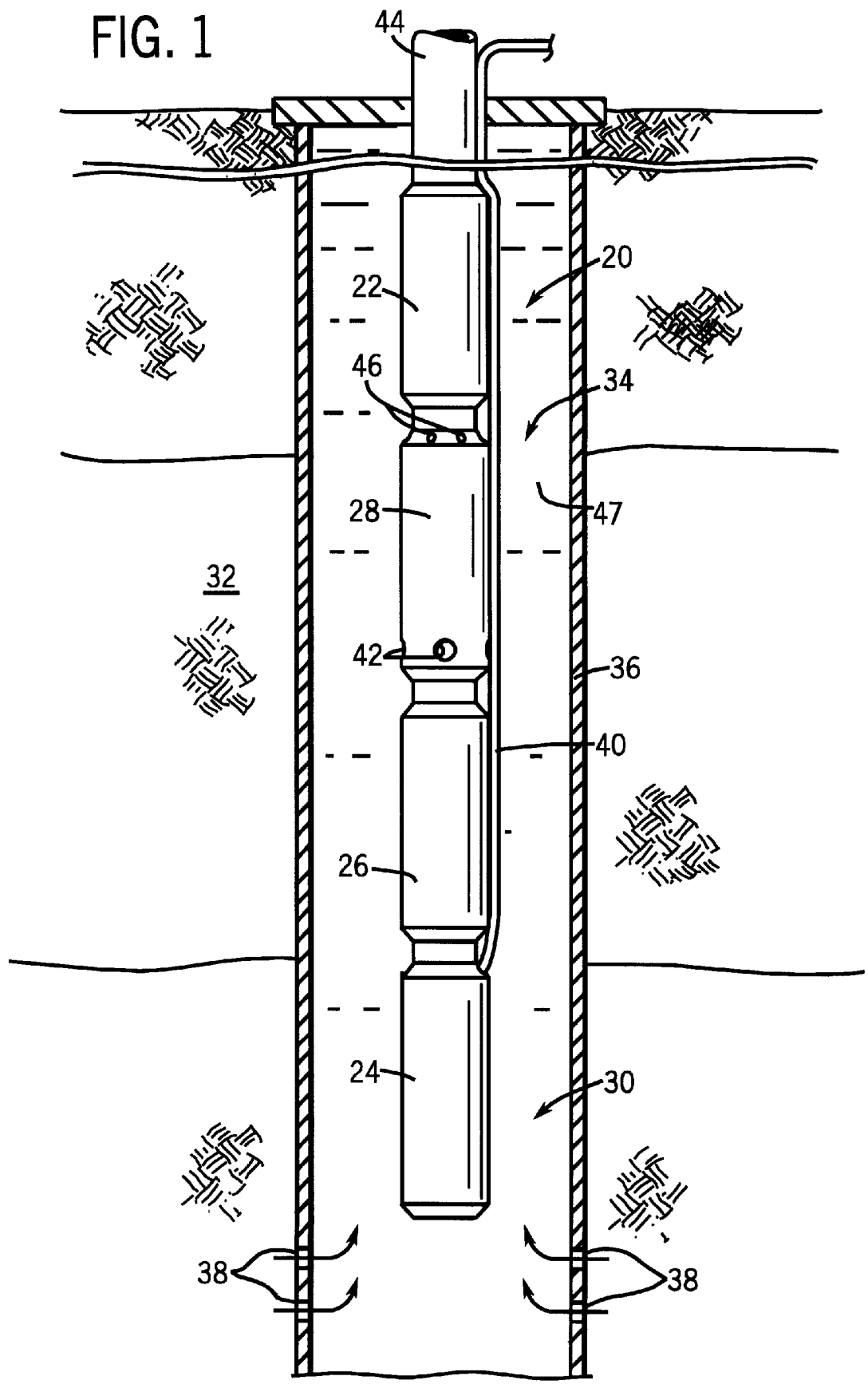
FIG. 1 is a front elevational view of a submergible pumping system positioned in a wellbore, according to a preferred embodiment of the present invention.

Referring generally to FIG. 1, a submergible pumping system 20 is illustrated according to a preferred embodiment of the present invention. Submergible pumping system 20 may comprise a variety of components depending upon the particular application or environment in which it is used. However, system 20 typically includes at least a centrifugal pump 22, a submergible motor 24 to power pump 22, a motor protector 26, and a gas separator 28.

Gas separator 28 can be used in a variety of environments for separating gases from a variety of fluid mixtures. However, one exemplary environment is in a pumping system 20 disposed within a well. Often, petroleum and other production fluids have substantial gas mixed through the liquid portion. This gas can form bubbles or pockets that are detrimental to the performance of the centrifugal pump 22 if not separated out. Accordingly, the wellbore environment and the production of petroleum is a good example of an environment in which the inventive gas separator, such as gas separator 28, can be utilized.

System 20 is designed for deployment in a well 30 within a geological formation 32 that contains desirable production fluids, such as petroleum. In a conventional application, a wellbore 34 is drilled and lined with a wellbore casing 36. Pumping system 20 is deployed within wellbore 34 at a desired location. System 20 then is used to pump the wellbore fluids that enter wellbore 34 through a plurality of openings 38 formed through wellbore casing 36.

In operation, submergible motor 24 is powered via electricity supplied by a power cable 40. Motor 24 rotates an internal shaft that extends through protector 26 and gas separator 28 to rotate impellers within centrifugal pump 22. Motor protector 26 prevents wellbore fluids from contaminating the lubricants within submergible motor 24.

Centrifugal pump 22 draws wellbore fluids into gas separator 28 through inlet openings 42. The fluid mixture entering inlet openings 42 is separated into gaseous and liquid components within separator 28. The liquid components are directed upwardly to pump 22 which, in turn, pumps the liquid to the earth's surface through production tubing 44. Meanwhile, the separated gas is vented through outlet vents 46 to an annulus 47, formed between the components of system 20 and wellbore casing 36. It should be noted that deployment systems, other than production tubing, potentially can be used. Also, the liquid can be diverted to the annulus while the gas component is directed upward through tubing or some other style of vent.

Figure 2:
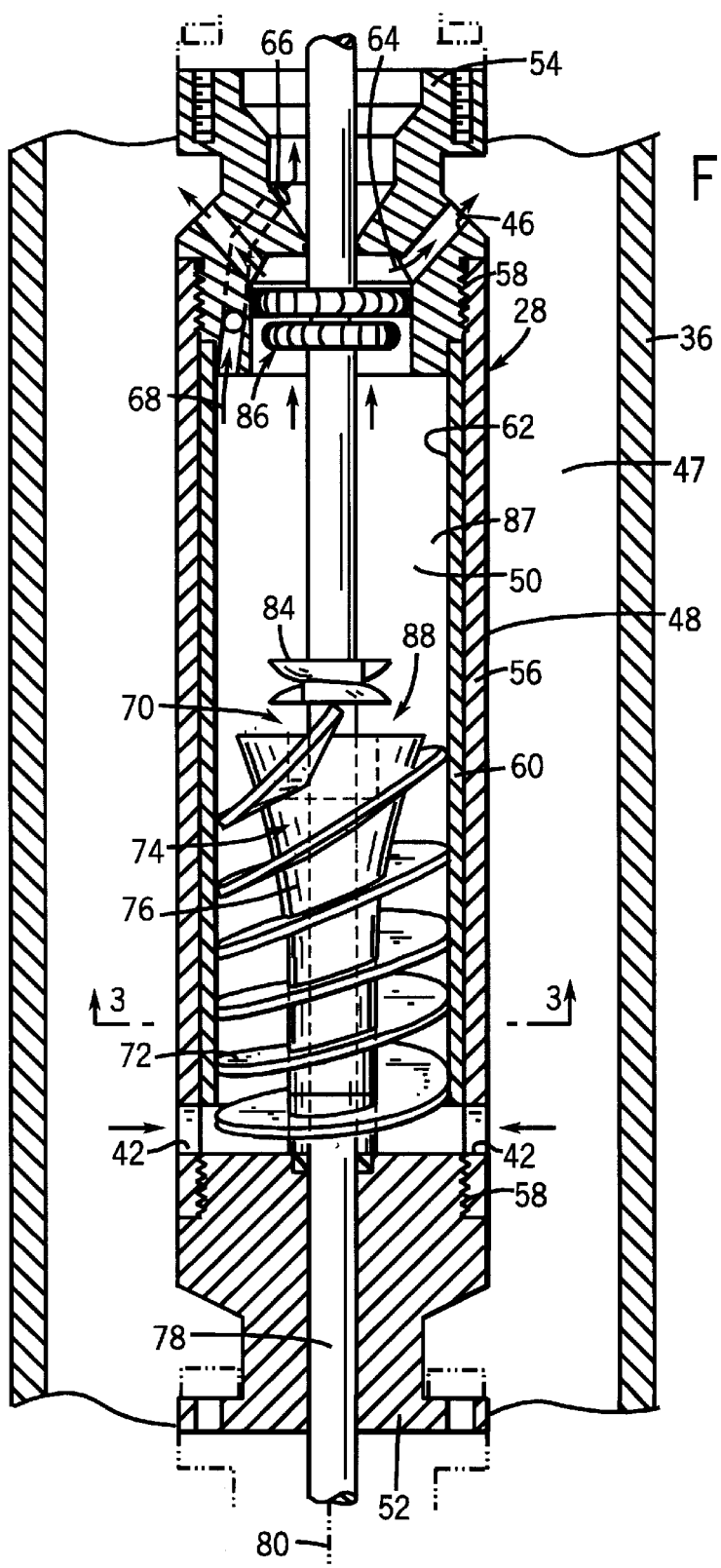
FIG. 2 is a cross-sectional view taken generally along the axis of a gas separator, according to a preferred embodiment of the present invention, showing the internal flow director system.
Figure 3:
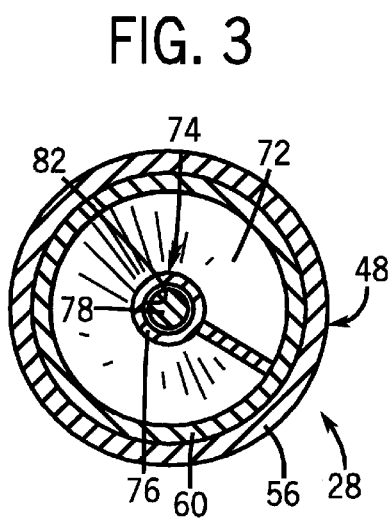
FIG. 3 is a cross-sectional view taken generally along line 3—3 of FIG. 2.

Referring generally to FIGS. 2 and 3, a preferred embodiment of gas separator 28 is illustrated. Separator 28 includes a housing 48 defining a generally hollow, cylindrical interior 50. Housing 48 includes a first attachment end 52 by which the separator may be attached to another component, such as motor protector 26. Housing 48 also includes a second attachment end 54 disposed on an opposite end from first attachment end 52, and designed to facilitate attachment to another component, such as centrifugal pump 22.

Housing 48 also includes an outer wall 56 extending between first attachment end 52 and second attachment end 54. Outer wall 56 may be connected to attachment ends 52 and 54 in a variety of ways, including integral formation therewith, welded engagement and threaded engagement. Preferably, at least one of the ends, such as second attachment end 54 is threadably engaged with outer wall 56 at a threaded region 58. Housing 48 also may include a hardened liner 60 disposed radially inward from outer wall 56 to reduce wear from any abrasive materials circulating through hollow interior 50.

Housing 48 also includes an interior surface 62 that is typically cylindrical in shape. In the illustrated embodiment, interior surface 62 is the inner surface of hardened liner 60.

Fluid mixture inlets 42 are disposed for communication with hollow interior 50, generally proximate first attachment end 52. In this embodiment, fluid mixture inlets 42 are formed to direct fluid flow radially inward into hollow interior 50.

Gas outlet vents 46 are disposed in second attachment end 54, sometimes referred to as the crossover. Each gas outlet vent 46 includes a port 64 positioned generally for communication with the radial center of hollow interior 50. Also, a liquid outlet 66 directs liquid from separator 28 to the next sequential component, e.g. pump 22. Liquid outlet or liquid outlets 66 each include a liquid port 68 disposed in fluid communication with hollow interior 50 at a generally radially outlying position. Specifically, ports 64 are in communication with hollow interior 50 at a position radially inward from liquid ports 68. The positioning of ports 64 and 68 facilitate the separation and removal of the liquid and gas components, because the heavier liquid components are circulated and forced, via centrifugal force, to the radially outlying region along interior surface 62, while the lighter gaseous components remain towards the radial center of hollow interior 50. Thus, the liquid components exit through radially outlying liquid ports 68 and liquid outlets 66, while the gases are vented through radially inward ports 64 and gas outlet vents 46. Typically, liquid outlets 66 crossover to the interior, and gas outlet vents 46 crossover to the exterior of separator 28, i.e. annulus 47.

A flow director system 70 is mounted within hollow interior 50. Flow director system 70 includes a coiled, e.g., helical or spiral, fin or vane 72 that is mounted in a stationary position within hollow interior 50 to create a stationary screw. For example, fin 72 may be welded to or integrally cast with liner 60. If necessary, flow director system 70 may also include an accelerator mechanism 74 designed to accelerate the fluid flow along fin 72 as it moves upwardly through flow director system 70. In the embodiment illustrated in FIG. 2, an exemplary accelerator mechanism 74 comprises a shaft shroud 76 that has an increasing diameter moving in the direction from first attachment end 52 to second attachment end 54.

A shaft 78 is rotatably mounted in gas separator 28. Shaft 78 generally is disposed along a longitudinal axis 80 of gas separator 28. Shaft 78 also extends through the axial center of coiled fin 72. However, shaft 78 preferably is not connected to fin 72 or shroud 76, but rather extends through an opening 82 disposed through the axial center of fin 72.

Gas separator 28 may be designed such that shaft shroud 76 is attached to shaft 78 for rotation within fin 72. However, the preferable design is one in which shaft shroud 76 is affixed to fin 72 and the shaft 78 is allowed to rotate with respect to the fixed shaft shroud 76.

Fin 72 and shaft shroud 76 may be affixed in a stationary position in a variety of ways. For example, fin 72 may be welded to both liner 60 and shaft shroud 76. Alternatively, fin 72 and liner 60 may be formed by monolithic casting or machining of metal stock. Potentially, the liner 60, fin 72 and shaft shroud 76 may all be formed as a monolithic unit, e.g., a monolithic casting.

Depending on the environment in which gas separator 28 is used, it may be advantageous to attach a propeller 84 to shaft 78 directly above fin 72. Propeller 84 assists the flow director system 70 in centrifuging the fluid at low flow rates and low pressures, e.g. during start up of the pumping system. Propeller 84 imparts motion to the fluid flowing through gas separator 28 in the same direction as that imparted by the stationary flow director system 70. Preferably, the diameter of propeller 84 does not exceed the upper diameter of shaft shroud 76.

Gas separator 28 also includes a compressor 86. By way of example, compressor 86 is a small, turbine fan-type compressor located in a gas separation region 87 near the top of hollow interior 50 just below gas outlet ports 64. Optionally, a portion of compressor 86 can be disposed below liquid ports 68 to assist in imparting centrifugal force to the fluid mixture during startup and low flow rates. Alternatively, an additional propeller, such as propeller 84, can be added just below liquid ports 68.

Gas separation region 87 is disposed generally between gas outlet ports 64 and flow director system 70 to facilitate separation of liquid phase and gaseous phase. The main function of the compressor 86 is to impart positive pressure on the gaseous phase such that it can be forced through ports 64 and outlet vents 46 for exhaustion into annulus 47 of wellbore 34.

In operation, the fluid mixture from wellbore 34 is forced inwardly through fluid inlet openings 42. The natural, hydrostatic pressure within wellbore 34 moves the fluid mixture in through inlet openings 42 with sufficient force to circulate the fluid mixture in a spiral pattern along fin 72. As the fluid mixture continues to circulate upwardly through flow director system 70, the cross-sectional area of the flow path through which it moves decreases as the diameter of shaft shroud 76 increases.

The decrease in cross-sectional area of the flow path increases the velocity of the flow. Upon exiting flow director system 70 at an exit 88, the liquid portion of the fluid mixture has been forced radially outwardly via the centrifugal force created by the circulating motion imparted in flow director system 70. Meanwhile, the lighter gaseous phase remains centrally located within hollow interior 50.

The liquid portion of the mixture continues to circulate along interior surface 62 as it moves up through hollow interior 50 until it enters liquid exit port 68. The momentum of the liquid flow carries it through liquid port 68 and liquid outlet 66 into pump 22. After entering pump 22, the liquid is pumped through production tubing 44 to the earth's surface. The separated, gaseous phase, on the other hand, rises through the center of the vortex created by the circulating liquid. Compressor 86 sufficiently pressurizes this gaseous phase such that it may be forced into ports 64 and vented to annulus 47 via outlet vents 46.

It also should be noted that propeller 84 is configured to assist creation of the vortex by propelling the liquid phase outwardly to interior surface 62. Typically, propeller 84 is only necessary, if at all, during periods of slower liquid velocity, such as that during start up of pumping system 20. Once pump 22 is operating and drawing on hollow interior 50, the pressure differential between hollow interior 50 and the naturally occurring hydrostatic pressure external to gas separator 28 is sufficient to maintain circulation of the fluid mixture and separation of the liquid and gaseous phases without assistance from propeller 84.

Referring generally to FIGS. 4 and 5, an alternate embodiment of flow director system 70 is illustrated. In this embodiment, accelerator mechanism 74 comprises a series of consecutively shorter distances 90 between each succeeding coil, i.e. flight, of fin or vane 72. Thus, as the fluid mixture circulates along fin 72, the cross-sectional area of the flow path decreases over at least a portion of flow director system 70. This decrease in cross-sectional area of the fluid flow path causes an increase in the velocity of fluid flow. Additionally, the coils of fin 72 may be oriented with an increasing pitch to permit exit of the liquid in a direction more closely aligned with the axial direction.

In the illustrated embodiment, the shaft shroud is omitted. However, the decreasing spacing between coils of fin 72 could be used in conjunction with a shaft shroud having increasing diameter. It also should be noted that FIG. 4 illustrates an exemplary monolithic casting of liner 60 and fin 72.

Referring generally to FIG. 6, another alternate embodiment of gas separator 28 is illustrated. In this embodiment, flow director system 70 utilizes a coiled fin 72 in which the wall thickness 92 continually increases in the direction of fluid flow through flow director system 70. Thus, as the fluid mixture circulates upwardly through flow director system 70, the cross-sectional area of the fluid flow path decreases. This, again, causes an increase in velocity of the fluid mixture to assist in creating a vortex within hollow interior 50 for separation of liquid phase and gaseous phase.

Figure 7:
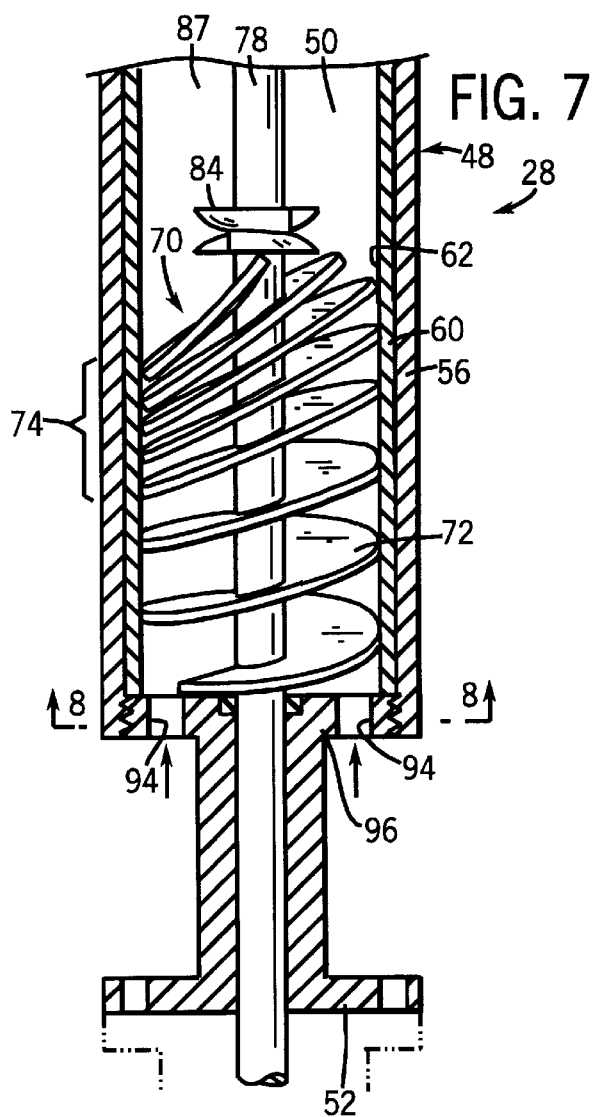
FIG. 7 illustrates another alternate embodiment of the gas separator illustrated in FIG. 2.
Figure 8:
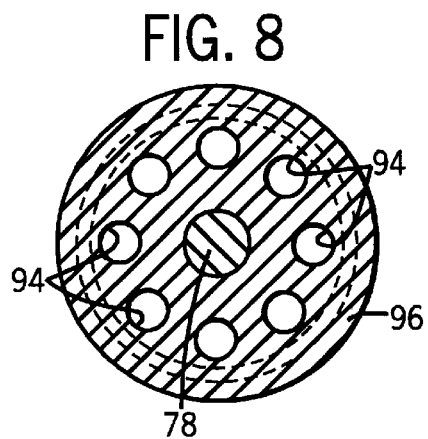
FIG. 8 is a cross-sectional view taken generally along line 8—8 of FIG. 7.

Referring generally to FIGS. 7 and 8, another alternate embodiment of gas separator 28 is illustrated. In this embodiment, the fluid inlet openings are aligned axially rather than radially. Preferably, a plurality of axial fluid inlet openings 94 are disposed through a bottom plate 96 of housing 48. Thus, fluid is forced into hollow interior 50 in an axial direction rather than a radial direction. Depending on the configuration of flow director system 70, the axial orientation may facilitate creation of the vortex.

Figure 9:
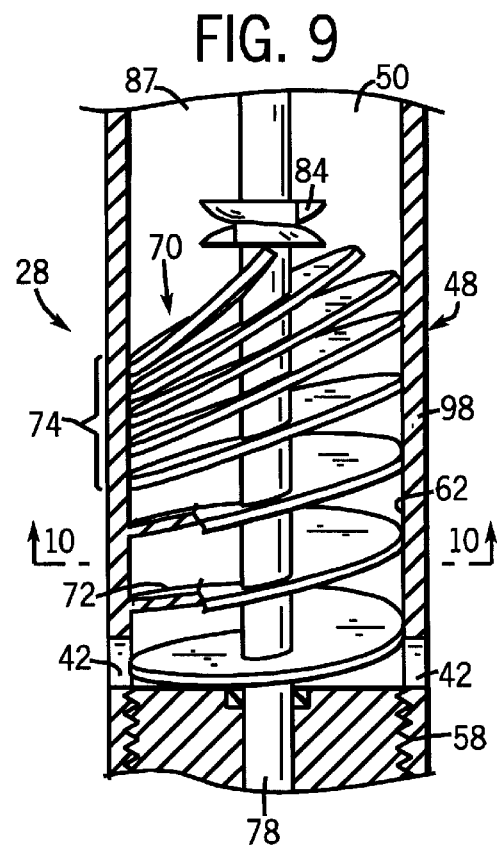
FIG. 9 is another alternate embodiment of the gas separator illustrated in FIG. 2.
Figure 10:
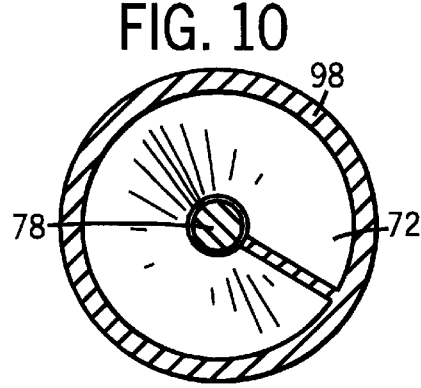
FIG. 10 is a cross-sectional view taken generally along line 10—10 of FIG. 9.

Referring to FIGS. 9 and 10, another embodiment of the gas separator 28 is illustrated. In this embodiment, outer wall 56 and fin 72 of flow director system 70 are combined in a single monolithic formation 98. For certain applications, it may be appropriate to eliminate harden liner 60 and create a single combined housing 48 and coiled fin 72. In harsher environments, however, it is often desirable to utilize harden liner 60. In the latter situation, fin 72 and liner 60 also can be formed as a single unit, such as the monolithic casting illustrated in FIG. 4.

It will be understood that the foregoing description is of preferred embodiments of this invention, and that the invention is not limited to the specific forms shown. For example, a variety of gas separator designs can be implemented; several types of spiral/helical fins can be used in the stationary vortex inducer; a variety of fluid accelerators can be adapted for use in a given gas separator; and a variety of materials and manufacturing techniques can be used to construct the enclosed flow director system as a single monolithic unit or as a combination of components. These and other modifications may be made in the design and arrangement of the elements without departing from the scope of the invention as expressed in the appended claims.

What is claimed is:

1. A gas separator for use in a submergible pumping system deployed in a wellbore to pump a production fluid, comprising:

a housing having an interior surface that is generally tubular in shape, defining a hollow interior;

a fluid mixture inlet disposed in the housing;

a liquid outlet disposed in the housing and including a liquid port exposed to the hollow interior;

a gas outlet disposed in the housing and including a gas port exposed to the hollow interior at a position radially inward from the port; and a flow director system mounted in a stationary position and extending into the hollow interior, the flow director system being configured to accelerate the flow of fluid and to direct fluid flow in a generally spiral pattern along the interior surface between the mixture inlet and the liquid outlet.

2. The gas separator as recited in claim 1, wherein the flow director system comprises an accelerator mechanism to accelerate the flow of fluid as the fluid travels along the interior surface, and a stationary screw having a fixed vane extending in a generally coiled path along at least a portion of the interior surface.

3. The gas separator as recited in claim 2, wherein the accelerator mechanism comprises a compression region along the fixed vane where the area between flights of the fixed vane is decreased.

4. The gas separator as recited in claim 2, wherein the accelerator mechanism comprises a shroud having an increasing diameter in the axial direction of fluid flow.

5. The gas separator as recited in claim 4, wherein the fixed vane is oriented with an increasing pitch.

6. The gas separator as recited in claim 1, wherein a gas separation cavity is disposed between the gas outlet and the flow director system.

7. The gas separator as recited in claim 1, further comprising a propeller disposed within the gas separation cavity to propel fluid in a radially outward direction.

8. The gas separator as recited in claim 1, further comprising a compressor to force gas through the gas outlet.

9. The gas separator as recited in claim 1, wherein the housing comprises a liner.

10. A gas separator for use in a submergible pumping system deployed in a wellbore to pump a production fluid, comprising:
an enclosed, stationary screw through which a production fluid mixture is forced to impart a centrifugal force on the production fluid mixture to accelerate the flow of production fluid and to direct production fluid flow in a generally spiral pattern.

11. The gas separator as recited in claim 10, further comprising:
an accelerator mechanism cooperating with the stationary screw to increase the velocity at which the fluid mixture travels through the enclosed, stationary screw.

12. The gas separator as recited in claim 11, wherein the enclosed, stationary screw comprises a fixed vane generally disposed in a coil and the accelerator mechanism comprises a compression region along the fixed vane where the area between flights of the fixed vane is decreased.

13. The gas separator as recited in claim 11, wherein the accelerator mechanism comprises a shroud having an increasing diameter in the axial direction of fluid flow.

14. The gas separator as recited in claim 13, wherein the enclosed stationary screw is configured with an increasing pitch.

15. A method for separating gas from a fluid mixture, comprising:
directing a fluid mixture through a cylindrical cavity formed by an interior wall surface;
circulating the fluid mixture along a stationary guide disposed along the interior wall to import a centrifugal force thereto;
accelerating the fluid mixture by decreasing the cross-sectional area along the fluid mixture's flow path;
separating a gas component and a liquid component from the fluid mixture; and
individually removing the gas component and the liquid component from the cylindrical cavity.

16. The method as recited in claim 15, further comprising pressurizing the gas component within the cylindrical cavity.

17. The method as recited in claim 15, wherein the step of circulating includes orienting the stationary guide in a coiled pattern with an increasing pitch.

18. The method as recited in claim 15, wherein the step of increasing comprises decreasing the cross-sectional area of the cylindrical cavity along an axial flow path of the fluid mixture.

19. The method as recited in claim 15, wherein the step of circulating comprises orienting the stationary guide in a coiled pattern along the interior wall surface to form a plurality of flights; and wherein the step of increasing includes orienting the stationary guide such that the fluid flow path is increasingly restricted along at least a portion of the stationary guide.

20. The method as recited in claim 15, further comprising admitting the fluid mixture into the cylindrical cavity in a generally radial direction.

21. The method as recited in claim 15, further comprising admitting the fluid mixture into the cylindrical cavity in a generally axial direction.

* * * * *